(No Model.) W. H. JENNINGS. 2 Sheets—Sheet 2.
PROCESS OF AND APPARATUS FOR SEPARATING SEEDS FROM CUCUMBERS, &c.
No. 283,787. Patented Aug. 28, 1883.
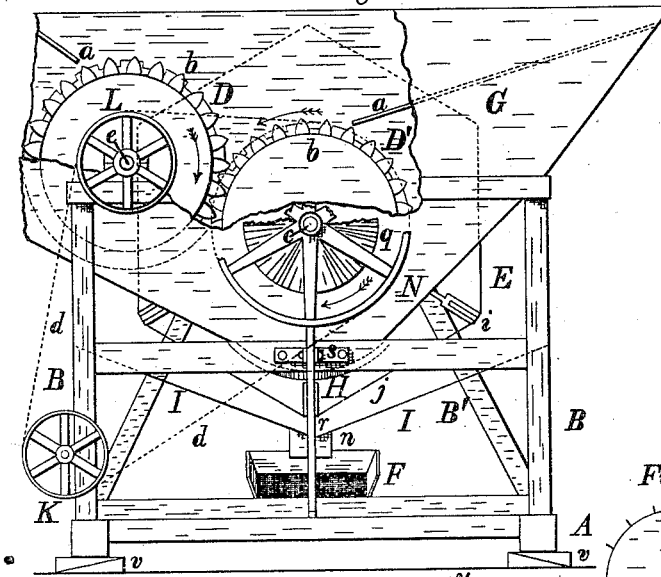
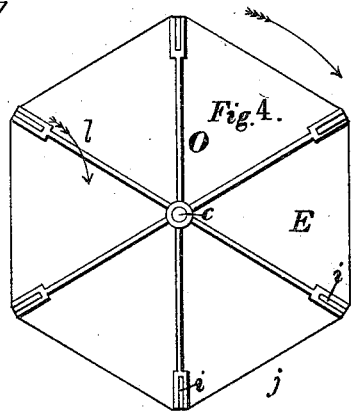
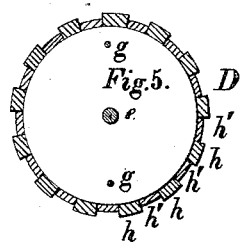
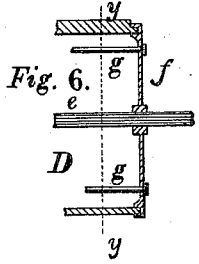
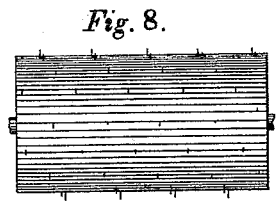
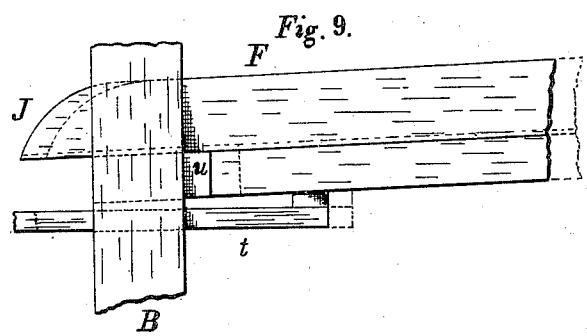
WITNESSES=
H. G. Phillips.
C. H. Caldwell.
INVENTOR=
Wayland H. Jennings,
By Geo. B. Selden,
Atty.

UNITED STATES PATENT OFFICE.

WAYLAND H. JENNINGS, OF ROCHESTER, NEW YORK.

PROCESS OF AND APPARATUS FOR SEPARATING SEEDS FROM CUCUMBERS, &c.

SPECIFICATION forming part of Letters Patent No. 283,787, dated August 28, 1883.

Application filed March 8, 1883. (No model.)

*To all whom it may concern:*

Be it known that I, WAYLAND H. JENNINGS, of Rochester, Monroe county, New York, have invented an improved process of separating seeds from cucumbers, tomatoes, melons, and other similar vegetables, and also certain improvements in the machinery for operating the said process, of which the following is a specification, reference being had to the accompanying drawings.

My invention relates to an improved process of and apparatus for separating the seeds from cucumbers and other similar fruits, which process and apparatus are hereinafter fully described and specified.

My improved apparatus for separating seeds from cucumbers, &c., is represented in the accompanying drawings, in which—

Figure 1 is a plan view. Fig. 2 is an elevation. Fig. 3 is an end view. Fig. 4 is an end view of the reel. Fig. 5 is a transverse section through one of the crushing-rollers on the line $y\ y$, Fig. 6. Fig. 6 is a partial longitudinal section of the same. Figs. 7 and 8 are respectively end and side views of a modified form of the crushing-rollers. Fig. 9 is a side view of a portion of the shaking sieve which separates the seeds from the liquid materials or vegetable pulp.

My improved apparatus for separating seeds consists of a suitable frame-work, A A B B' C C, which supports the operating parts, consisting of a pair of ribbed rollers, D D', a revolving bolt or screen, E, and a shaking-sieve, F.

In the practical operation of the machine the vegetables from which the seeds are to be removed are placed in the hopper G, from which they pass through the crushing-rollers D D', and the crushed material is delivered by the spout or trough H into the revolving reel E, which separates the seeds and watery pulp from the outer skins or rinds, which are discharged at the tail of the reel, while the seeds and pulp pass through the meshes of the bolt onto a trough, I, from which they pass onto the shaking-screen F, which delivers the seeds at its lower end, J, Fig. 2, while the pulp flows through its meshes.

In Fig. 3 of the drawings a part of the side of the hopper G is broken away, so as to show the ribbed rollers D D', the inclined planes $a$ $a$, by which the substances to be crushed are guided between the rollers, and the gearing $b$ $b$, by which the rollers are caused to revolve together. The hopper G is constructed of any suitable material, and supported on the frame-work of the machine in any convenient manner. For the sake of simplicity of construction I have represented the roller D' as revolving on the reel-shaft $c$, being free to turn thereon. Power is imparted to the roller D from the pulley K by the belt $d$, running over the pulley L on the shaft $e$ of roller D, and also about the pulley N on the reel-shaft $c$. The roller D' is driven from the roller D by the gears $b$ $b$. This arrangement forms a cheap and convenient mode of driving the rollers and the reel; but any other means of operating these parts may be employed.

The ribbed rollers consist of two heads, $f$, attached to the shaft $e$, and held together by the bolts $g$ $g$. Staves $h$ $h'$, running parallel with the shaft, are fitted at each end into grooves on the inner faces of the heads $f$. Each alternate stave $h$ is made thicker than those next to it, $h'$ $h'$, on each side thereby forming a series of longitudinal grooves on the surface of the roller. The rollers are so arranged on their shafts that the high staves on the one come opposite the low staves on the other as they revolve, thereby drawing in and crushing the materials placed on the inclined planes $a$ $a$. The boxes in which the shaft $e$ of the roller D revolves are arranged so as to be adjusted on the frame C C for the purpose of altering the distance between the rollers D D', the teeth of the gears $b$ $b$ being made long enough to admit of this adjustment. The bolts by which the boxes are attached to the frame pass through slots in the frame, so that their position may be varied.

Below the rollers, and at the bottom of the hopper G, is placed the trough H, which has a sufficient inclination from the horizontal line to deliver the crushed vegetables into the reel E. The reel consists of two or more spiders, O O, attached to the shaft $c$, the arms of which at their entremities support the longitudinal ribs $i$ $i$, to which the cloth $j$ is affixed. A slotted opening is formed in the ends of the arms of the spider, to receive the ribs $i$ $i$, as represented in Fig. 4. As the ribs project radially inward for a short distance, they operate as they revolve to carry up the crushed vegetables in the interior of the reel, and to allow them to fall, as indicated by the arrow *l* in Fig. 4, to the bottom of the reel, by which the separation of the seeds from the pulp and rinds is much facilitated. A suitable spout, P, Fig. 7, is placed at the tail of the reel to carry off the rinds or refuse too coarse to pass through the meshes of the bolt. The size of the meshes of the wire-cloth with which the bolt is clothed may be varied to suit the character of the seeds which it is desired to obtain by the use of my improved apparatus. Thus for cucumbers I employ wire-cloth having about three meshes to the inch, and for tomatoes wire-cloth about four meshes to the inch. I prefer to make the reel about three feet in diameter, and to run it at from twenty to twenty-five revolutions per minute.

Below the reel is placed a trough, I, which may be inclined to cause the passage of the seeds and pulp along it to the spout *n*, Figs. 1, 2, and 3, through which they are delivered to the head of the shaking-sieve F, or the roller end of the machine may be elevated, as represented in Fig. 2, so as to facilitate the passage of the materials in both the reel and the trough toward the opposite end of the machine. This elevation may be conveniently secured by the use of wedges *w*, as represented in Fig. 3.

The shaking-sieve F consists of a suitable frame supported so as to be vibrated lengthwise of the machine on the rollers *o o*, Fig. 2, or in any other preferred manner. The sieve F is vibrated by means of the cam-wheel *q* on the reel-shaft, acting on the lever *r*, pivoted at *s* to the frame-work B, and connected at its lower end with the sieve-frame by the rod *t*. In order to effectually jar out the seeds from the pulp, the sieve F at the end of its motion to the left-hand in Fig. 2 comes against a rubber spring or bumper, *u*, Figs. 2 and 9, by which its vibration is suddenly arrested and the discharge of the seeds at J secured. The pulp passes through the sieve and is disposed of in any suitable manner. The seeds, being received into a suitable receptacle at the discharge end of the sieve F, are fermented and washed in the ordinary manner and dried and prepared for the market as usual. I find the best results are obtained by the use on the sieve F of wire-cloth of eleven meshes to the inch for tomato-seed and of eight meshes to the inch for cucumber-seed.

In constructing a machine for use on tomatoes alone I prefer to employ the smooth rollers D″ D″, provided with projecting pins or teeth, as represented in Figs. 7 and 8.

Instead of the revolving bolt E, a flat vibrating screen may be employed; but I prefer to use the reel, the essential point being that the meshes of the cloth should be of sufficient size to permit the free passage of the seeds and pulp, so as to effect the separation of the refuse materials.

I claim—

1. The herein-described process of obtaining the seeds from cucumbers and other suitable fruits, consisting in crushing the ripe vegetables between revolving rollers, in separating the seeds and pulp from the rinds and coarse refuse on a moving sieve or screen, separating the seeds from the pulp by screening, and in subsequently fermenting and washing the seeds, substantially as and for the purposes set forth.

2. The combination of the rollers D D′, bolt E, screen F, and suitable intermediate delivery spouts or passages, substantially as and for the purposes set forth.

3. The ribbed roller D, formed of a series of alternately thick and thin wooden staves, *h h h′ h′*, supported on shaft *e* by heads *f*, substantially as described.

4. The combination of the rollers D D′, gears *b b*, reel-shaft *c*, reel E, pulleys K L N, and belt *d*, substantially as and for the purposes set forth.

WAYLAND H. JENNINGS.

Witnesses:
 H. G. PHILLIPS,
 CHAS. BUSH.